(12) United States Patent
Feng et al.

(10) Patent No.: US 9,189,654 B2
(45) Date of Patent: Nov. 17, 2015

(54) ON-CHIP STRUCTURE FOR SECURITY APPLICATION

(71) Applicant: International Business Machines Corporation, Armonk, NY (US)

(72) Inventors: Kai Di Feng, Hopewell Junction, NY (US); Wai-Kin Li, Hopewell Junction, NY (US); Chengwen Pei, Hopewell Junction, NY (US); Ping-Chuan Wang, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 14/096,345

(22) Filed: Dec. 4, 2013

(65) Prior Publication Data

US 2015/0154421 A1 Jun. 4, 2015

(51) Int. Cl.
*G06F 21/71* (2013.01)
*G06F 7/58* (2006.01)

(52) U.S. Cl.
CPC ................ *G06F 21/71* (2013.01); *G06F 7/588* (2013.01)

(58) Field of Classification Search
CPC .................................. G06F 21/71; G06F 7/588
See application file for complete search history.

(56) References Cited

U.S. PATENT DOCUMENTS

| | | | |
|---|---|---|---|
| 7,653,197 B2 | 1/2010 | Van Dijk | |
| 8,300,450 B2 | 10/2012 | Christensen et al. | |
| 8,525,169 B1* | 9/2013 | Edelstein et al. | 257/48 |
| 2007/0038871 A1 | 2/2007 | Kahlman et al. | |
| 2007/0090312 A1 | 4/2007 | Stallinga et al. | |
| 2008/0044027 A1 | 2/2008 | Van Dijk | |
| 2008/0231418 A1 | 9/2008 | Ophey et al. | |
| 2008/0279373 A1 | 11/2008 | Erhart et al. | |
| 2009/0083833 A1 | 3/2009 | Ziola et al. | |
| 2009/0132624 A1* | 5/2009 | Haselsteiner et al. | 708/255 |
| 2009/0153841 A1 | 6/2009 | Ophey et al. | |
| 2010/0122353 A1 | 5/2010 | Koushanfar et al. | |
| 2010/0127822 A1 | 5/2010 | Devadas | |
| 2010/0146261 A1 | 6/2010 | Talstra et al. | |

(Continued)

OTHER PUBLICATIONS

At-speed Delay Characterization for IC Authentication and Trojan Horse Detection, Lie Li and John Lach, Hardware-Oriented Security and Trust, 2008. HOST 2008. IEEE International Workshop on Publication Date: Jun. 9-9, 2008.

*Primary Examiner* — Amir Mehrmanesh
(74) *Attorney, Agent, or Firm* — Garg Law Firm, PLLC; Rakesh Garg; William H. Steinberg

(57) ABSTRACT

A set of physical unclonable function (PUF) cells is configured with a set of capacitive devices in an integrated circuit (IC). A subset of PUF cells includes a corresponding subset of capacitive devices that have failed during fabrication. A charging current sufficient to charge an operational capacitive device in a PUF cell is sent to the set of PUF cells. A determination is made whether an output voltage of a PUF cell exceeds a threshold. When the output voltage exceeding the threshold, a logic value of 1 is produced at a position in a bit-string. The determination and the producing is repeated for each PUF cell in the set to output a bit-string, which includes 1s and 0s in random positions. The bit-string is used in a security application as a random stable value owing to a random pattern of 1s and 0s present in the bit-string.

17 Claims, 13 Drawing Sheets

(56) References Cited

U.S. PATENT DOCUMENTS

| | | |
|---|---|---|
| 2010/0293384 A1 | 11/2010 | Potkonjak |
| 2010/0293612 A1 | 11/2010 | Potkonjak |
| 2010/0322418 A1 | 12/2010 | Potkonjak |
| 2011/0002461 A1 | 1/2011 | Erhart et al. |
| 2011/0163088 A1 | 7/2011 | Besling et al. |
| 2011/0254141 A1 | 10/2011 | Roest et al. |
| 2012/0293354 A1* | 11/2012 | Suzuki .......................... 341/173 |
| 2013/0083586 A1* | 4/2013 | Petitprez ....................... 365/102 |

* cited by examiner

ON-CHIP STRUCTURE FOR SECURITY APPLICATION

TECHNICAL FIELD

The present invention relates generally to a method, system, and computer program product for devices usable in a security infrastructure. More particularly, the present invention relates to a method, system, and computer program product for on-chip structure for security application.

BACKGROUND

Modern day electronics include components that use integrated circuits. An integrated circuit (IC) is an electronic circuit formed using silicon as a substrate and by adding impurities to form solid-state electronic devices, such as transistors, diodes, and resistors. Commonly known as a "chip," an integrated circuit is generally encased in hard plastic, forming a "package." The components in modern day electronics generally appear to be rectangular black plastic pellets with connector pins protruding from the plastic encasement. Often, many such packages are electrically coupled so that the chips therein form an electronic circuit to perform certain functions.

The software tools used for designing ICs produce, manipulate, or otherwise work with the circuit layout and circuit components on very small scales. Some of the components that such a tool may manipulate may only measure tens of nanometer across when formed in silicon. The designs produced and manipulated using these software tools are complex, often including hundreds of thousands of such components interconnected to form an intended electronic circuitry.

A layout includes shapes that the designer selects and positions to achieve a design objective. The objective is to have the shape—the target shape—appear on the wafer as designed. However, the shapes may not appear exactly as designed when manufactured on the wafer through photolithography. For example, a rectangular shape with sharp corners may appear as a rectangular shape with rounded corners on the wafer.

Once a design layout, also referred to simply as a layout, has been finalized for an IC, the design is converted into a set of masks or reticles. A set of masks or reticles is one or more masks or reticles. During manufacture, a semiconductor wafer is exposed to light or radiation through a mask to form microscopic components of the IC. This process is known as photolithography.

A manufacturing mask is a mask usable for successfully manufacturing or printing the contents of the mask onto wafer. During the photolithographic printing process, radiation is focused through the mask and at certain desired intensity of the radiation. This intensity of the radiation is commonly referred to as "dose." The focus and the dosing of the radiation have to be precisely controlled to achieve the desired shape and electrical characteristics on the wafer.

SUMMARY

The illustrative embodiments provide a method, apparatus, and computer program product for on-chip structure for security application. An embodiment includes a method for hardware-based stable random number generation. The embodiment configures a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices. The embodiment sends a charging current to the set of PUF cells, wherein the charging current is sufficient to charge an operational capacitive device in a PUF cell above a threshold voltage value. The embodiment determines whether an output voltage of a PUF cell in the set of PUF cells exceeds the threshold voltage value. The embodiment produces, responsive to the output voltage exceeding the threshold voltage value, a logic value of 1 at a position in a bit-string. The embodiment repeats the determining and the producing for each PUF cell in the set of PUF cells to output a bit-string, wherein the bit-string includes 1s and 0s in random positions. The embodiment uses the bit-string in a security application as a random stable value owing to a random pattern of 1s and 0s present in the bit-string.

Another embodiment includes a computer program product for hardware-based stable random number generation. The embodiment further includes one or more computer-readable tangible storage devices. The embodiment further includes program instructions, stored on at least one of the one or more storage devices, to configure a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices. The embodiment further includes program instructions, stored on at least one of the one or more storage devices, to configure sending a charging current to the set of PUF cells, wherein the charging current is sufficient to charge an operational capacitive device in a PUF cell above a threshold voltage value. The embodiment further includes program instructions, stored on at least one of the one or more storage devices, to configure determining whether an output voltage of a PUF cell in the set of PUF cells exceeds the threshold voltage value. The embodiment further includes program instructions, stored on at least one of the one or more storage devices, to configure producing, responsive to the output voltage exceeding the threshold voltage value, a logic value of 1 at a position in a bit-string. The embodiment further includes program instructions, stored on at least one of the one or more storage devices, to configure repeating the determining and the producing for each PUF cell in the set of PUF cells to output a bit-string, wherein the bit-string includes 1s and 0s in random positions. The embodiment further includes program instructions, stored on at least one of the one or more storage devices, to configure using the bit-string in a security application as a random stable value owing to a random pattern of 1s and 0s present in the bit-string.

Another embodiment includes an apparatus for hardware-based stable random number generation. The embodiment further includes a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices. The embodiment further includes a current source to send a charging current to the set of PUF cells, wherein the charging current is sufficient to charge an operational capacitive device in a PUF cell above a threshold voltage value. The embodiment further includes a comparing structure to determine whether an output voltage of a PUF cell in the set of PUF cells exceeds the threshold voltage value. The embodiment further includes a structure to produce, responsive to the output voltage exceeding the threshold voltage value, a logic value of 1 at a position in a bit-string. The embodiment further includes a structure to repeat the determining and the producing for each PUF cell in the set of PUF cells to output a bit-string, wherein the bit-string includes 1s and 0s in random positions. The embodiment further includes a structure to use the bit-string in a security application as a random stable value owing to a random pattern of 1s and 0s present in the bit-string.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
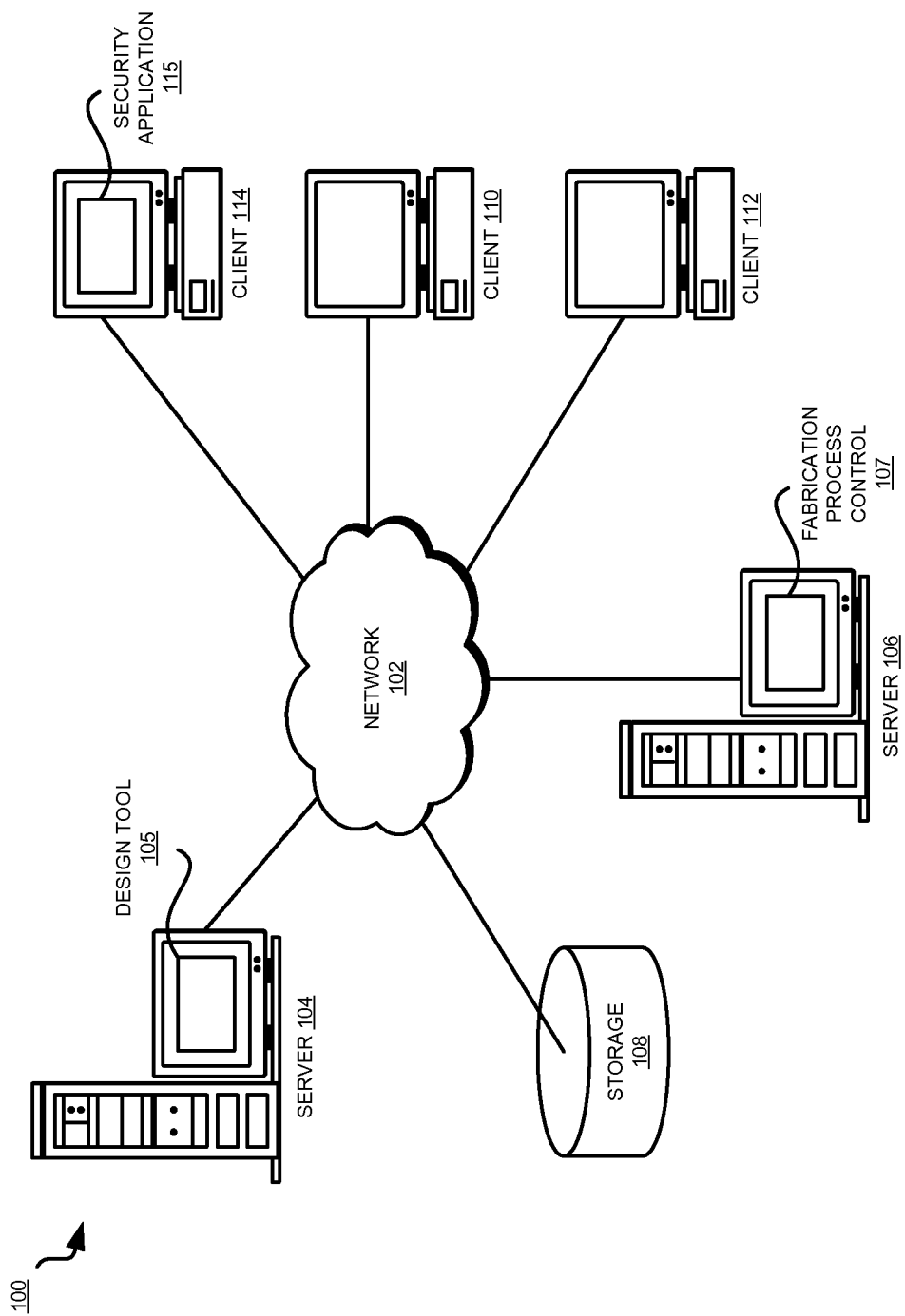
FIG. 1 depicts a block diagram of a network of data processing systems in which illustrative embodiments may be implemented.

Hardware-implemented random numbers are difficult to implement. Deliberate effort to randomize an output of a circuit results in pseudo-randomness at best. Furthermore, an output of a circuit is susceptible to operating condition changes, even within the normal range of operating conditions for that circuit.

When the circuit is expected to produce a stable value at the output, changes in the output for any reason becomes unacceptable. Particularly, when the output of the circuit is used as a randomly generated output, the stability of the output is critical for the correct operation of the security applications that rely on that random output.

For example, suppose a circuit is designed to output the same randomly selected value every time the circuit is operated, and that value is expected to remain unchanged over a period of operation. Suppose that an encryption algorithm uses that output to encrypt data. Further suppose that the output of the circuit drifts or changes over time due to operating conditions such as time, age, temperature, voltage, frequency, or noise. Now, the encryption cannot operate reliably when using that random value because that value can change, causing the encryption to change, and further causing a decryption to fail.

The illustrative embodiments recognize that security applications need hardware-implemented functions that evaluate to a specific random value consistently. The illustrative embodiments also recognize that the hardware implementation of such functions should be simple, yet difficult if not impossible to duplicate. The illustrative embodiments further recognize that different fabrications of the same hardware-implemented function should evaluate to randomly different stable values.

The illustrative embodiments used to describe the invention generally address and solve the above-described problems and other problems related to hardware-implemented functions. The illustrative embodiments provide a method, system, and computer program product for amorphous data preparation for on-chip structure for security application.

The illustrative embodiments recognize that fabrication process variations during photolithography cause some shapes to be approximated, and some sizes to be altered from the respective shapes and sizes in the design. For example, a semiconductor device that is fabricated on wafer can exhibit different properties than the properties of that device in design due to process variations such as timing of exposure, accuracy of the exposure, focus of the exposure, precision of dosing (doping), precision of etching, permeation of materials, fusing of materials, adhesion of materials, impurities in materials, and many other process variations.

A physical unclonable function (PUF) of the illustrative embodiments is a function that is embodied in a physical structure, such as a hardware circuit in an IC chip. Particularly, within the scope of the illustrative embodiments, a fabrication process fabricates a PUF circuit in or together with the fabrication of another circuit on a wafer.

The PUF circuit of the illustrative embodiments comprises one or more PUF cells. The function embodied in PUF evaluates to a particular value. A PUF cell comprises a hardware circuit that operates to provide all or part of the PUF value.

According to the illustrative embodiments, the value of the PUF is random from one implementation to another in that different instances of the same PUF circuit fabricated using the same PUF cell design and the same fabrication process can evaluate to different values. Thus, even if the design of the PUF circuit, the PUF cells, and the method used to fabricate the PUF cells are all known, another implementation or another fabrication of the same PUF circuit will result in a randomly different value.

Furthermore, according to the illustrative embodiments, the value to which a PUF circuit evaluates is stable. In other words, once fabricated, a PUF circuit according to an embodiment will result in the same value under normal operating conditions expected for the IC in which the PUF circuit is fabricated. Thus, a PUF value according to the illustrative embodiments is random between different instances of the same PUF circuit, unpredictable even with the knowledge of the PUF function design, and stable during the operation of the PUF circuit.

The illustrative embodiments are described with respect to, certain circuits, values, measurements, evaluations, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limited to the illustrative embodiments. Additional or different advantages may be realized by specific illustrative embodiments. Furthermore, a particular illustrative embodiment may have some, all, or none of the advantages listed above.

Figure 2:
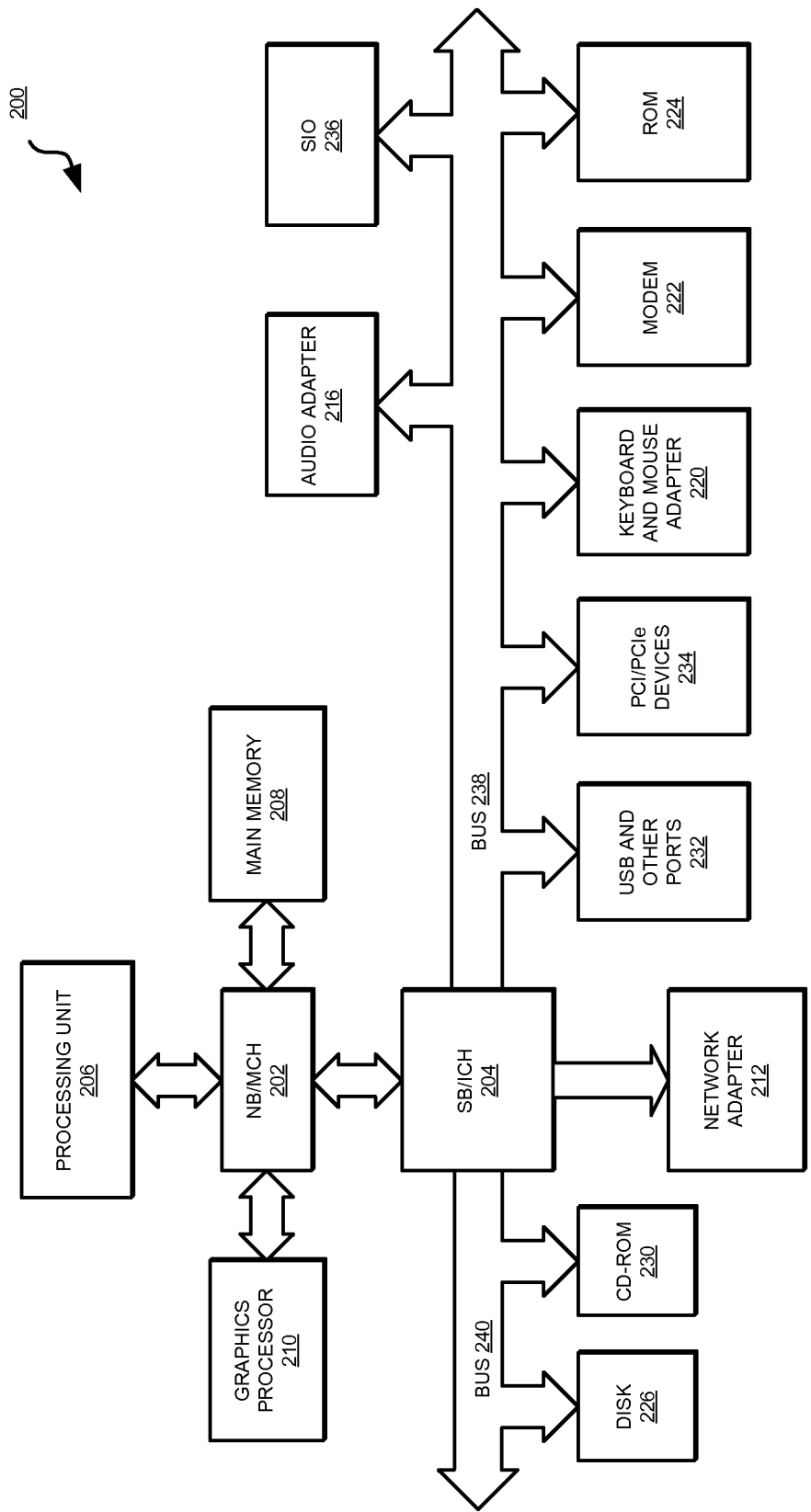
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Design tool 105 is usable to design a PUF circuit according to an embodiment described herein. Fabrication process control application 107 fabricates a PUF circuit, or causes a PUF circuit to be fabricated, in a semiconductor manufacturing operation. Security application 115 uses an output of a PUF circuit, which has been designed and fabricated according to an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as design tool 105, fabrication process control application 107, and security application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
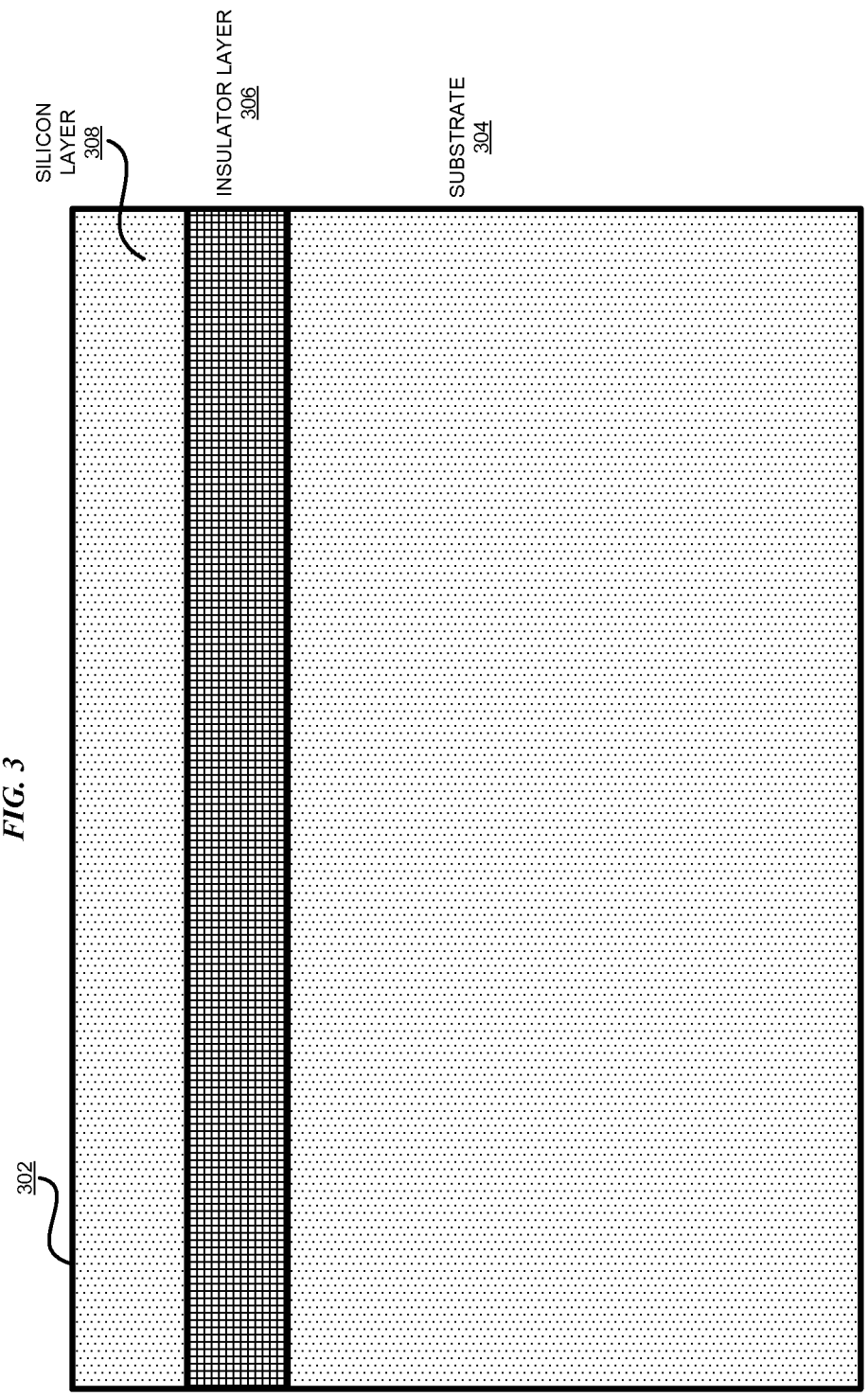
FIG. 3 depicts a cross-section of a wafer in which an illustrative embodiment can be implemented.

With reference to FIG. 3, this figure depicts a cross-section of a wafer in which an illustrative embodiment can be implemented. Fabrication process control application 107 in FIG. 1 controls a process for fabricating a PUF circuit according to an embodiment in wafer 302.

In one example embodiment, wafer 302, shown in a cross-section view, is configured as silicon On Insulator (SOI). Wafer 302 comprises substrate 304, insulator layer 306, and silicon layer 308.

In one embodiment, insulator layer 306 is formed using a silicon oxide, and acts as an insulator between silicon layer 308 and silicon substrate 304. In some cases, insulator layer 306 is also known as buried oxide layer (Box layer).

Most semiconductor components, such as transistors, are fabricated in silicon layer 308 by etching and doping silicon layer 308. Some components used in integrated circuits are called deep-trench components. Deep-trenching is a method of creating a component by drilling or etching through the insulator layer into the substrate. A capacitor is a component, which in some instances is formed using deep-trenching method. A capacitor formed using deep-trenching is called a deep-trench capacitor (DT Cap).

Figure 4:
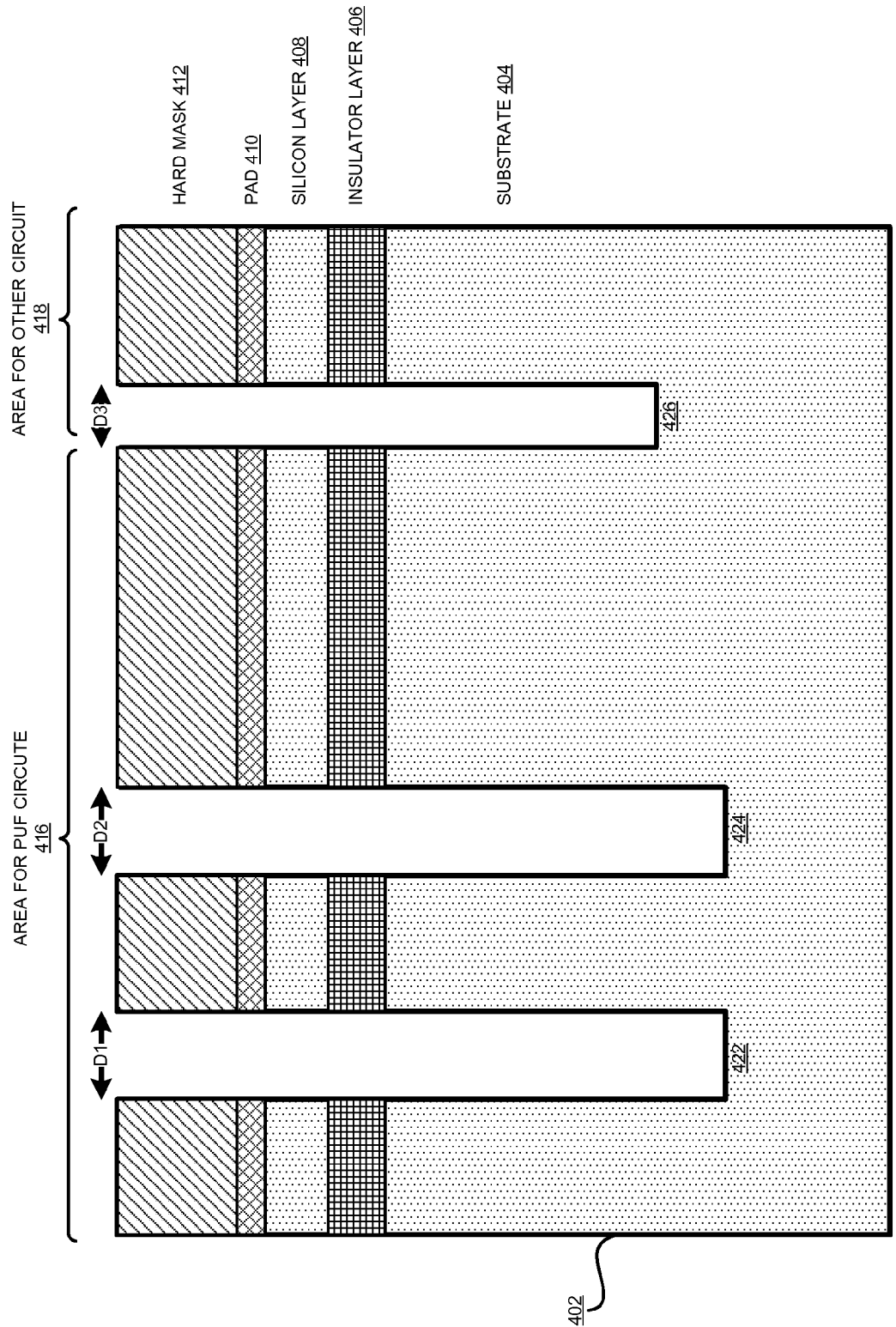
FIG. 4 depicts a cross-section of a modified wafer of FIG. 3 in accordance with an illustrative embodiment.

With reference to FIG. 4, this figure depicts a cross-section of a modified wafer of FIG. 3 in accordance with an illustrative embodiment. Design tool 105 in FIG. 1 is usable for designing the artifacts shown in FIG. 4. Fabrication process control application 107 in FIG. 1 controls a process for fabricating the artifacts depicted in this figure.

Wafer 402 is shown in cross-section view similar to wafer 302 with additional layers. Substrate 404, insulator layer 406, and silicon layer 408 are each the same as substrate 304, insulator layer 306, and silicon layer 308, respectively, in FIG. 3, but after the operations described with respect to FIG. 4 have been performed thereon. Design tool 105 in FIG. 1 configures the shapes depicted in FIG. 4. A fabrication process controlled by application 107 in FIG. 1 performs the operations to fabricate those shapes in wafer 402.

Reactive Ion Etching (RIE) is a presently used process for fabricating deep-trenches in wafer 402. Presently, the deep-trenching operation to make deep-trenches 422, 424, and 426, such as RIE, is controlled using pad 410 and hard mask 412. For example, pad 410 is a nitride layer that prevents etching outside the deep-trench location. Hard mask 412 prevents damage from the etching process to the area surrounding the deep-trench location.

Pad 410, hard mask 412, or both, may become unnecessary or may be replaced with other similarly purposed process control mechanisms in some fabrication methods for fabricating deep-trenches, and such methods are contemplated within the scope of the illustrative embodiments. Furthermore, RIE is described as a trenching technology only as an example and not to imply a limitation on the illustrative embodiments. Other similarly purposed technologies are usable in place of RIE and are contemplated within the scope of the illustrative embodiments.

Area 416 of wafer 402 is used for fabricating a PUF circuit of an embodiment. Area 418 is used to fabricate another circuit on wafer 402. Only as an example and without implying any limitation thereto, the example embodiment is described herein using a wafer on which a dynamic random access memory (DRAM) circuit, such as an Embedded DRAM (eDRAM) circuit, is also fabricated as another circuit in area 418. Generally, a PUF circuit of an embodiment can be designed and fabricated onto any wafer on which a deep-trench capacitor can be fabricated in the manner of an embodiment. For example, area 416 can exist on a wafer on which a processor circuit or another logic circuit is being fabricated in area 418.

A design tool configures and a fabrication process creates deep-trenches 422, 424, and 426. Deep-trench 426 is configured according to the needs of the circuit being fabricated in area 418. Deep-trenches 422 and 424 are configured to go deeper into substrate 404 as compared to deep-trench 426. One example way of controlling a depth of a trench is by controlling the width of the trench. For example, increasing the width of a deep-trench corresponds to an increased depth of the deep-trench, as a result of the usually fixed aspect ratio of the etch profile of RIE process. As depicted, deep-trench 422 and 424 of the PUF circuit are wider and therefore deeper than deep-trench 426 of the other circuit. In one embodiment, width D1 of deep-trench 422 is equal to width D2 of deep-trench 424, and width D3 of deep-trench 426 is less than widths D1 and D2.

Figure 5:
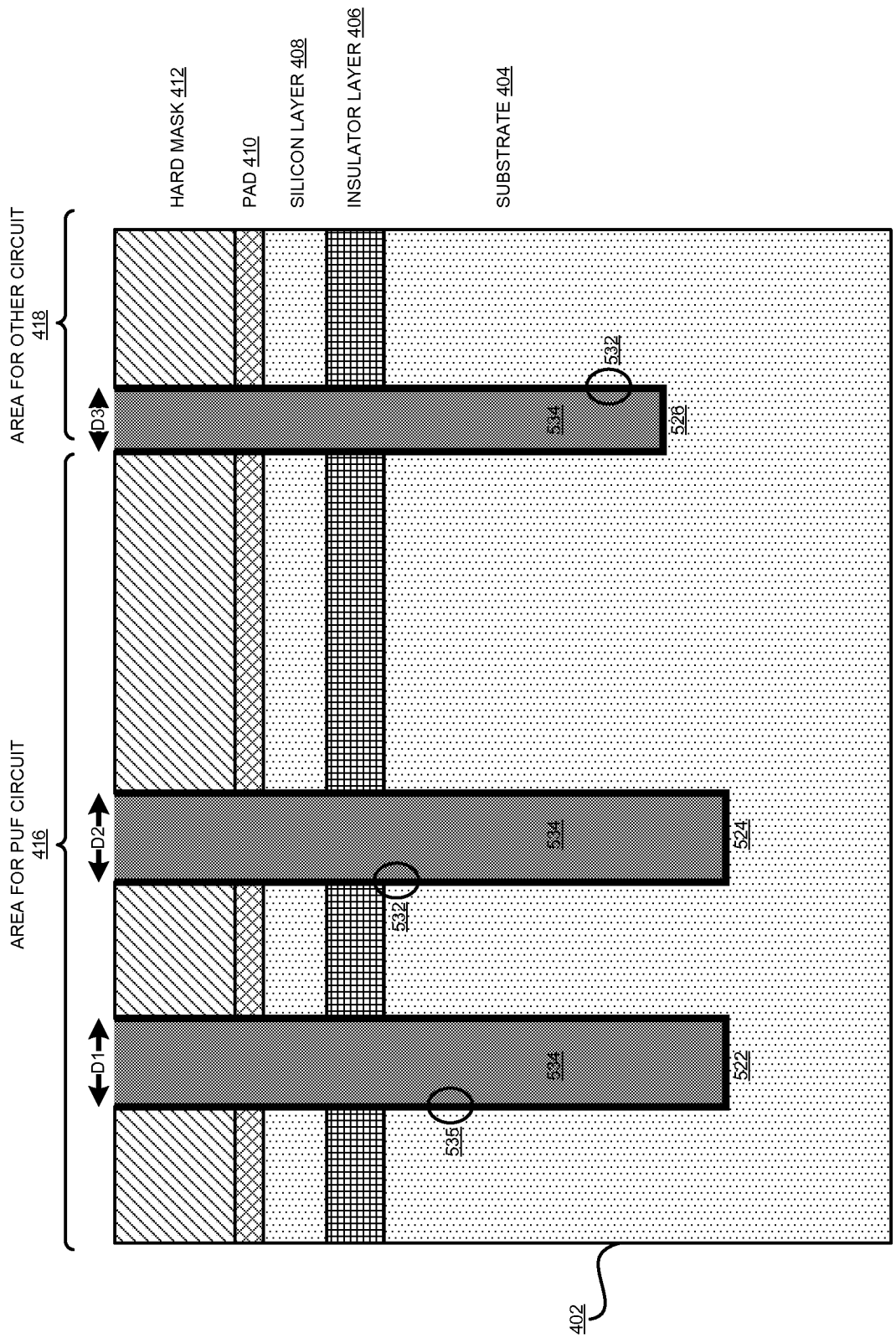
FIG. 5 depicts a cross-section of a further modified wafer of FIG. 4 in accordance with an illustrative embodiment.

With reference to FIG. 5, this figure depicts a cross-section of a further modified wafer of FIG. 4 in accordance with an illustrative embodiment. Design tool 105 in FIG. 1 is usable for designing the artifacts shown in FIG. 5. Fabrication process control application 107 in FIG. 1 controls a process for fabricating the artifacts depicted in this figure.

The wafer, substrate, insulator layer, silicon layer, pad, and hard mask are each the same as wafer 402, substrate 404, insulator layer 406, silicon layer 408, pad 410, and hard mask 412, respectively, in FIG. 4, but after the operations described with respect to FIG. 5 have been performed thereon. Deep-trenches 522, 524, and 526 are modified forms of deep-trenches 422, 424, and 426, respectively in FIG. 4. Design tool 105 in FIG. 1 configures the shapes depicted in FIG. 5. A fabrication process controlled by application 107 in FIG. 1 performs the operations to fabricate those shapes in wafer 502.

Insulating liner 528 electrically insulates the inside of deep-trenches 522, 524, and 526 from the material of substrate 404. In one embodiment, insulating liner 528 is two-layered. The first layer is a dielectric layer with higher than threshold resistance (hi-K dielectric) and the second layer is a metal nitride layer, e.g., Titanium Nitride.

Deep-trenches 522, 524, and 526 are filled with another conducting material 534. In one embodiment, conducting material 534 is polysilicon (poly fill). Where, in one embodiment, substrate 404 is single-crystal silicon crystal, polysilicon comprises small-crystal silicon, which is heavily doped (e.g., n doped) to exhibit metal-like conductive properties.

In one embodiment, the dielectric layer in insulator 532 separates conducting substrate 404 from conducting material 534, forming a capacitive device. The metal nitride layer in insulator 532 prevents diffusion of conducting material 534 into substrate 404, and provides improved adhesion of conducting material 534 to the walls of deep-trenches 522, 524, and 526.

Specific layers and materials are described only as examples and not as limitations on the illustrative embodiments. Those of ordinary skill in the art will be able to use different materials and different layer configurations for fabricating similar capacitive devices and the same are contemplated within the scope of the illustrative embodiments.

Figure 6:
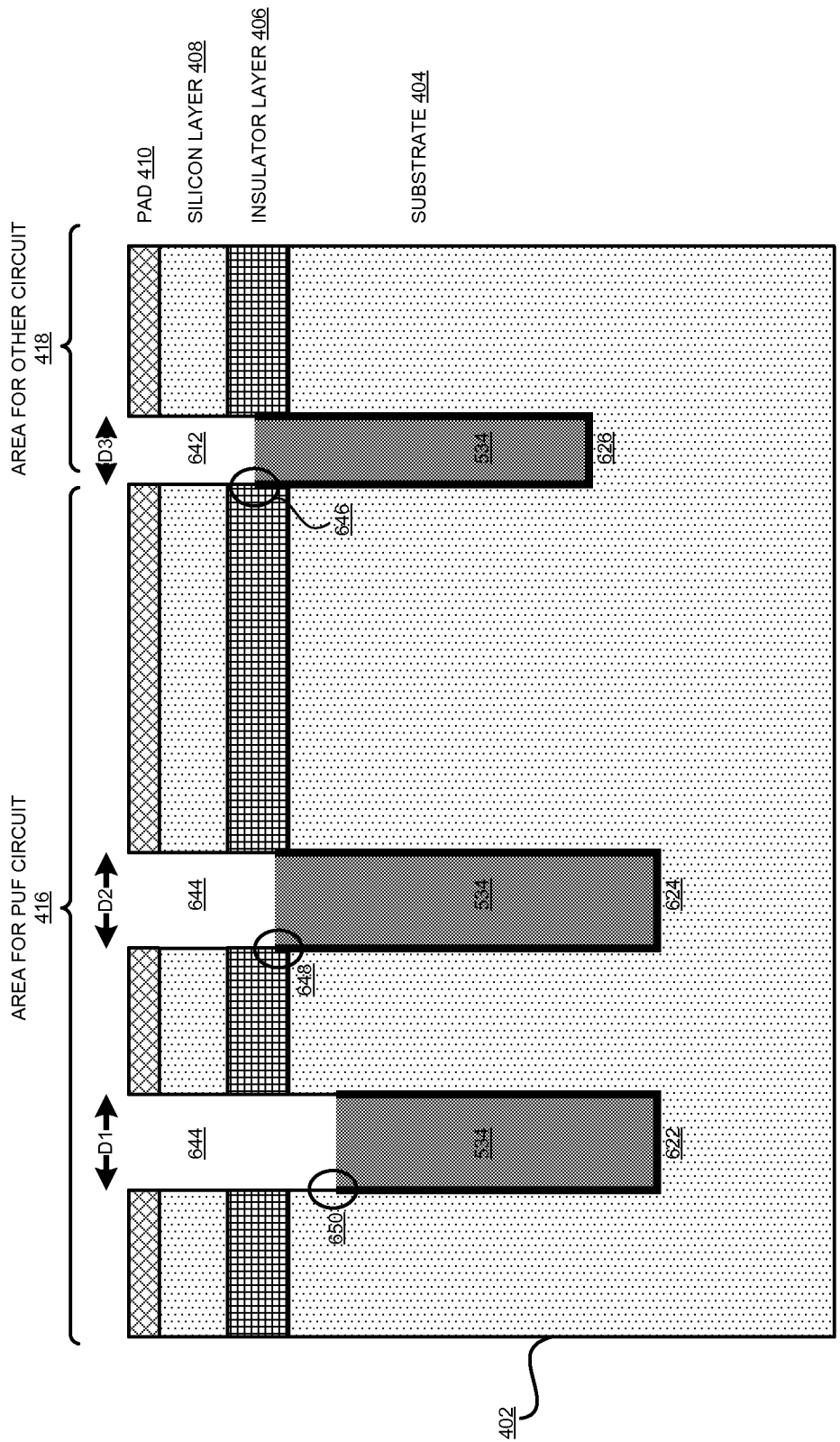
FIG. 6 depicts a cross-section of a further modified wafer of FIG. 5 in accordance with an illustrative embodiment.

With reference to FIG. 6, this figure depicts a cross-section of a further modified wafer of FIG. 5 in accordance with an illustrative embodiment. Design tool 105 in FIG. 1 is usable for designing the artifacts shown in FIG. 6. Fabrication process control application 107 in FIG. 1 controls a process for fabricating the artifacts depicted in this figure.

The depicted wafer, substrate, insulator layer, silicon layer, pad, hard mask, deep-trenches are the same as wafer, substrate, insulator layer, silicon layer, pad, hard mask, deep-trenches, respectively, in FIG. 5, but after the operations described with respect to FIG. 6 have been performed thereon. Deep-trenches 622, 624, and 626 are modified forms of deep-trenches 522, 524, and 526, respectively in FIG. 5. Design tool 105 in FIG. 1 configures the shapes depicted in FIG. 6. A fabrication process controlled by application 107 in FIG. 1 performs the operations to fabricate those shapes in wafer 502.

The design tool configures, and the fabrication process creates space or recess 642 in deep-trench 626 and recess 644 in deep-trenches 622 and 624. In one embodiment, hard mask 412 is removed leaving pad 410 as the top layer on wafer 402 through which the fabrication process creates the recesses.

The recessing operation has to be configured such that recess 642 reaches point 646 in insulator layer 406 and stops. Point 646 is sufficiently removed from the boundary of insulator layer 406 and substrate 404 such that even if process variations cause point 646 to drift above or below the designed position of point 646, recess 642 will not stop in silicon layer 408 or penetrate into substrate 404.

An embodiment configures the design tool for a recess 644 such that recess 644 reaches point 648 in insulator layer 406 and stops. Point 648 is sufficiently close to the boundary of insulator layer 406 and substrate 404 such that in some process variations for some deep-trenches in area 416, point 648 drifts above or below the designed position of point 648. Drifting above point 648 still maintains the insulation between conducting material 534 and substrate 404, and maintains the capacitive properties of a deep-trench. However, when point 648 drifts below the designed position of point 648, recess 644 is likely to penetrate into substrate 404, causing a short circuit between conducting material 534 and substrate 404, destroying the capacitive properties of that particular deep-trench.

In the depicted example, assume that the fabrication process fabricates recess 644 in deep-trench 624 up to the planned position of point 648. Accordingly, deep-trench 624 behaves like a DT Cap, which can hold a charge and provide a voltage output (potential difference from substrate 404). However, assume that some process variation in the fabrication process fabricates recess 644 in deep-trench 622 up to the planned position of point 650 instead. Accordingly, deep-trench 622 behaves like a short-circuited (shorted) DT Cap, which cannot hold a charge and cannot provide a potential difference from substrate 404.

In a manner similar to the manner of adjusting the depth of the trenching, an embodiment adjusts the depth of the recess. For example, in one embodiment, if a mean value is set for the depth of recess 642 in deep-trench 626 in area 418, a wider deep-trench, such as deep-trenches 622 and 624 receive deeper recesses 644 for the same mean value. In other words, the wider the deep-trench, the deeper is the recess in that deep-trench for a given mean depth value in such an embodiment.

In another embodiment, the depth of a recess in a deep-trench is a function of a width of the deep-trench. For example, mean value-adjusted recess depth can be further modulated by adjusting a size of the opening of a deep-trench, such as by changing D1 for deep-trench 622. Again, the wider is the opening of a deep-trench, the deeper and closer to substrate 404 the recess reaches into the deep-trench.

The illustrative embodiments recognize that the recess depth in a PUF circuit can be tuned by adjusting the mean value of the width of deep-trenches. Only for the clarity of the description, and not to imply a limitation on the illustrative embodiments, only the mean value-based recess depth modulation is described in the following example. Other modulations or combinations thereof can similarly be used for adjusting or modulating recess depths within the scope of the illustrative embodiments.

Suppose that the mean value of recess depth is set to such a value for deep-trench 626 that all recesses for deep-trenches 622 and 624 reach into substrate 404, causing all DT Caps in those deep-trenches to fail. The failed DT Caps never hold charge and always output a value of 0. An example manner of outputting a value from a PUF cell and a PUF circuit is described latter. The functioning of the PUF circuit is not very effective if several DT Caps are used, and the output is a string of 0s because all the DT Caps has failed. A string of 0s is not a strong random number value to use in security application 115 in FIG. 1.

Similarly, suppose that the mean value of recess depth is set to such a value for deep-trench 626 that none of the recesses for deep-trenches 622 and 624 reach into substrate 404, causing all DT Caps in those deep-trenches to remain operational. The operational DT Caps always hold charge and always output a value of 1. The functioning of the PUF circuit is again very effective if several DT Caps are used, and the output is a string of 1s because all the DT Caps remain functional. A string of 1s is not a strong random number value to use in security application 115 in FIG. 1.

Preferably, some DT Caps should fail due to process variations, and some DT Caps should remain operational once all DT Caps are fabricated in PUF circuit area 416. Then, in the fabrication of different chips, area 416 of the different chips contains different DT Caps that have failed in different deep-trenches. Accordingly, the PUF circuit of one chip outputs one random string of 1s and 0s, and the PUF circuit of another chip outputs another random string of 1s and 0s.

For example, assume that a particular PUF circuit comprises sixteen PUF cells, each PUF cell including one DT Cap, such as a DT Cap formed in deep-trench 622 or 624. The fabrication of that PUF circuit in one chip could output bit-string 0001011101010111, and the fabrication of that PUF circuit in another chip could output bit-string 0101011111001101.

Furthermore, because a 1 or a 0 value arises due to success or failure of the capacitive device being fabricated, the failed DT Caps remain failed and the operational DT Caps remain operational over the normal expected life of the circuit and over the normal expected operating conditions. Consequently, the value, to wit, the bit-string output from the fabricated PUF circuit also remains stable over the normal expected life of the circuit and over the normal expected operating conditions. In the above example, the PUF circuit in the first chip always outputs bit-string 0001011101010111, and the same PUF circuit in another chip always outputs bit-string 0101011111001101.

To produce such outcomes from different fabrications of the same PUF circuit, an embodiment configures the mean value of recess depth to such a value for deep-trench 626 that none of the recesses for deep-trenches 626 reach substrate 404 even with process variations, but point 648 in the design is so close to substrate 404 that some recesses in the deep-trenches of the PUF circuit randomly reach into substrate 404 and others do not, causing random DT Caps in those deep-trenches to remain operational. In one implementation, setting the mean value such that 30-80 percent of DT Caps failed in various fabrications of a PUF circuit yielded acceptable variations of the random bit-strings that were usable in security application 115.

Figure 7:
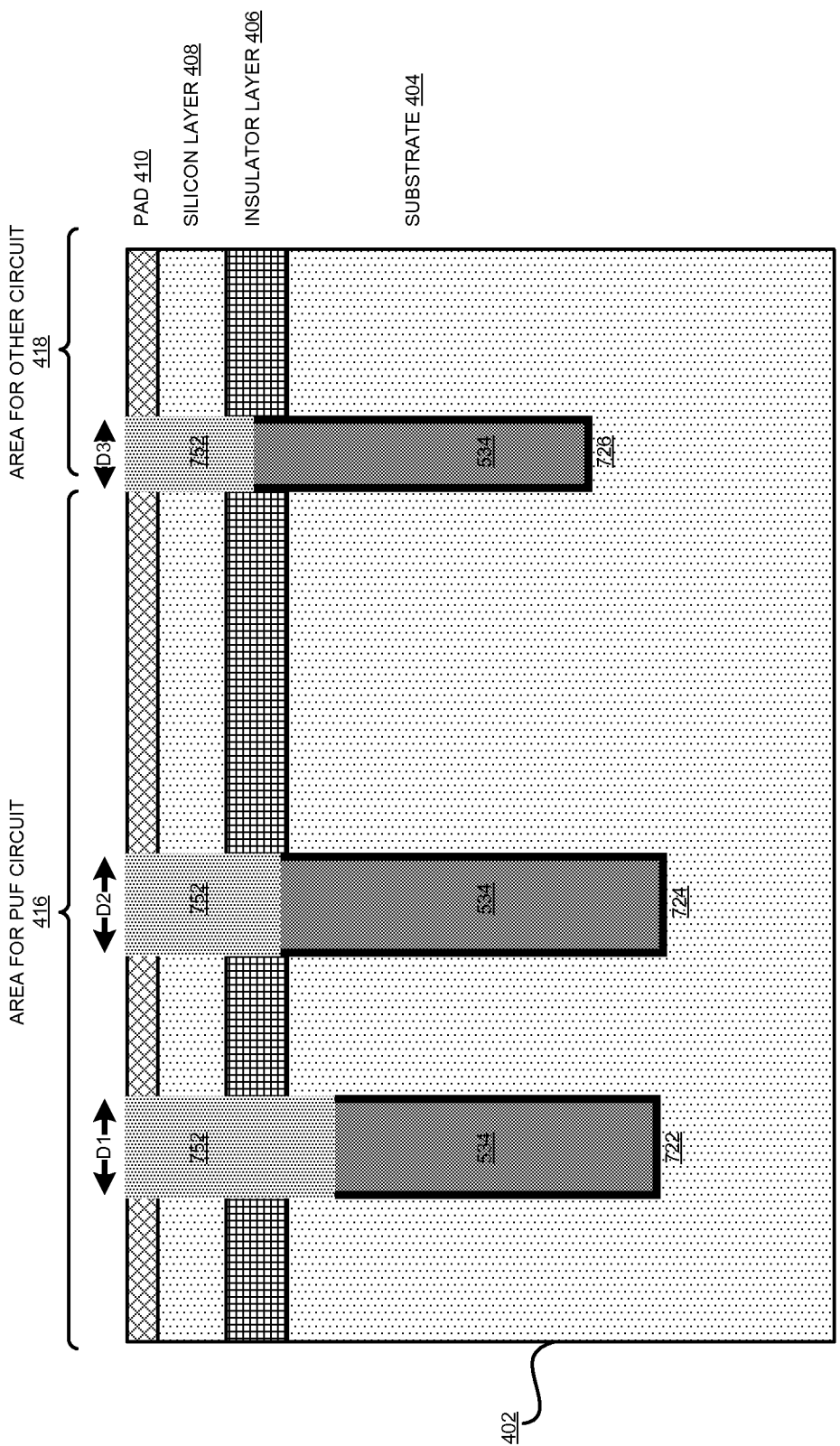
FIG. 7 depicts a cross-section of a further modified wafer of FIG. 6 in accordance with an illustrative embodiment.

With reference to FIG. 7, this figure depicts a cross-section of a further modified wafer of FIG. 6 in accordance with an illustrative embodiment. Design tool 105 in FIG. 1 is usable for designing the artifacts shown in FIG. 7. Fabrication process control application 107 in FIG. 1 controls a process for fabricating the artifacts depicted in this figure. All depicted artifacts are the same as the corresponding artifacts in FIG. 6, except where depicted or described differently in FIG. 7.

Deep-trenches 722, 724, and 726 are modified forms of deep-trenches 622, 624, and 626, respectively in FIG. 6. An embodiment fills recess 642 in deep-trench 726 and recesses 644 in deep-trench 722 and 724 with another conducting material 752. Conducting material 752 allows for connectors or terminals to be attached to conducting material 534. Conducting material 752 can be formed using any material suitable for this purpose within the scope of the illustrative embodiments. In one embodiment, conducting material 752 is formed using n+ polysilicon (n+ doped small-crystal silicon).

Figure 8:
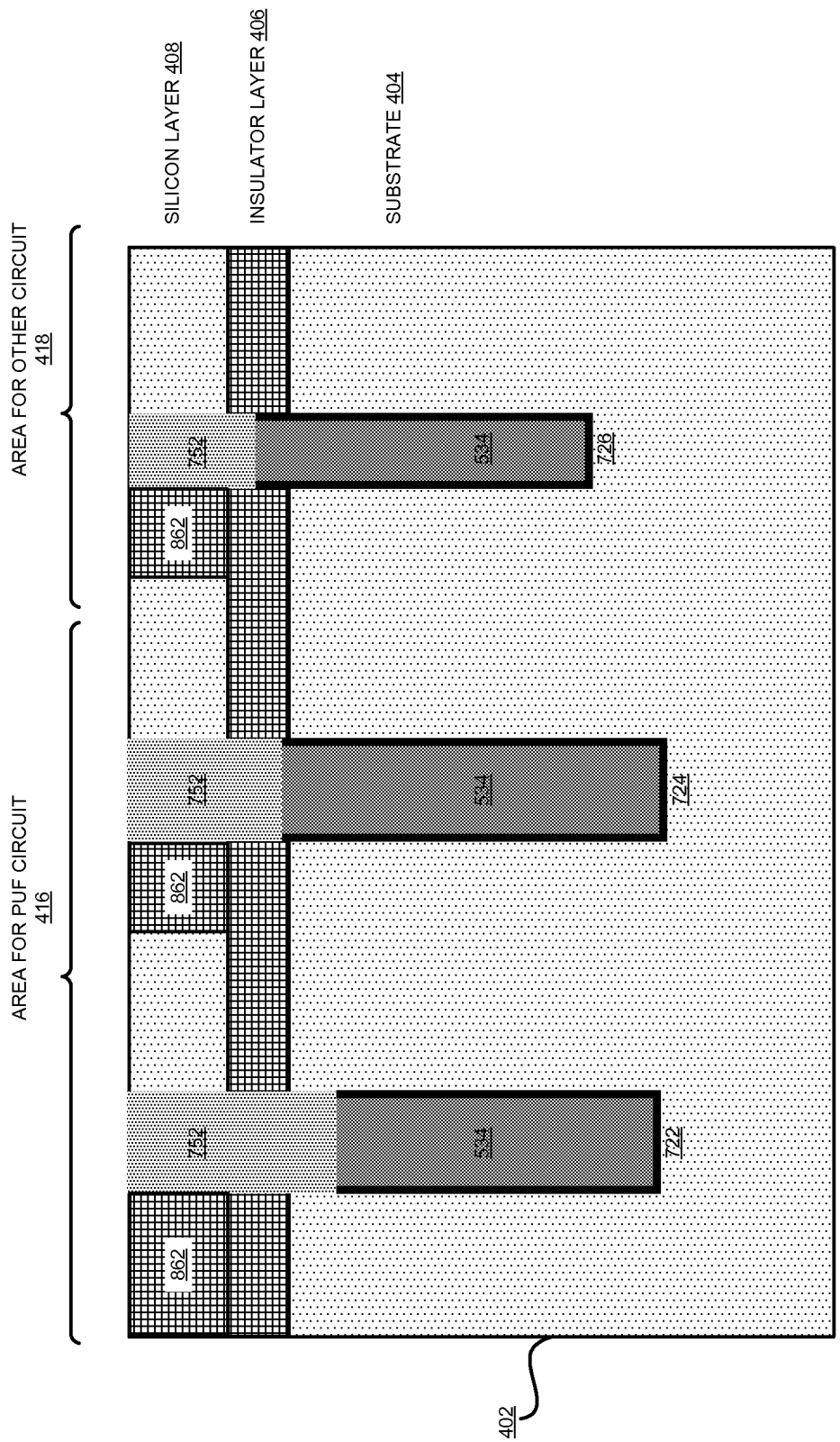
FIG. 8 depicts a cross-section of a further modified wafer of FIG. 7 in accordance with an illustrative embodiment.

With reference to FIG. 8, this figure depicts a cross-section of a further modified wafer of FIG. 7 in accordance with an illustrative embodiment. Design tool 105 in FIG. 1 is usable for designing the artifacts shown in FIG. 8. Fabrication process control application 107 in FIG. 1 controls a process for fabricating the artifacts depicted in this figure. All depicted are the same as the corresponding artifacts in FIG. 7, except where depicted or described differently in FIG. 8.

An embodiment removes pad 410 and electrically decouples different cells. For example, the design tool configures, and the fabrication process control application uses the configuration and causes a fabrication process to electrically decouple (isolate/insulate) various cells or components from one another by forming electrically insulating structures 862 in silicon layer 408. For example, a PUF cell containing DT Cap of deep-trench 722 is decoupled into a PUF cell containing DT Cap of deep-trench 724. A cell of the other circuit containing DT Cap of deep-trench 726 is similarly decoupled from the PUF cells and other cells in the other circuit. One embodiment uses shallow Trench Insulator (STI) method employing silicon oxide as insulator for performing the electrical decoupling.

The etching and the STI method are described only as examples of achieving electrical isolation between various cells in wafer 402. These methods are not intended to be limiting on the illustrative embodiments. The electrical decoupling can be accomplished in any suitable manner within the scope of the illustrative embodiments.

Figure 9:
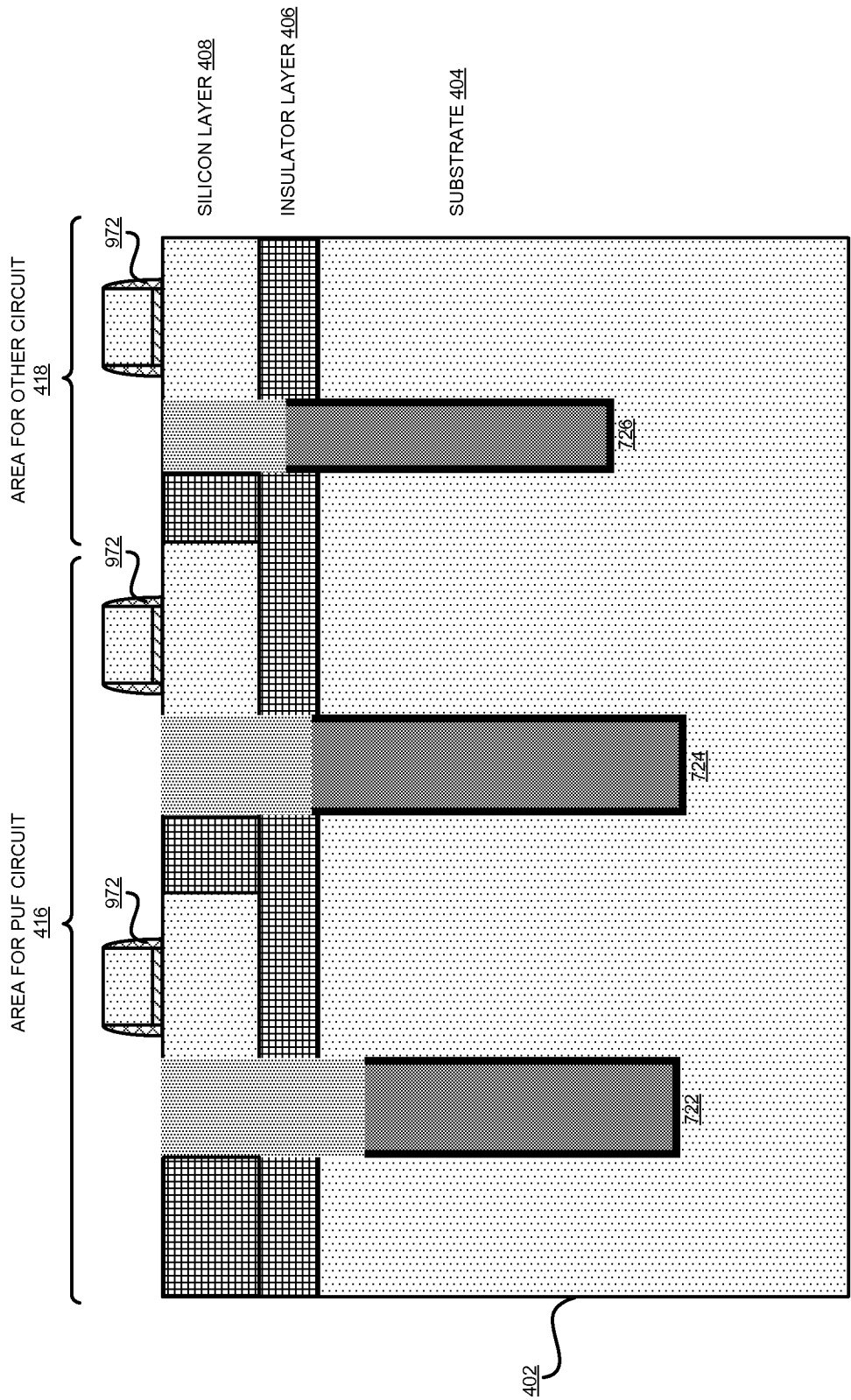
FIG. 9 depicts a cross-section of a further modified wafer of FIG. 8 in accordance with an illustrative embodiment.

With reference to FIG. 9, this figure depicts a cross-section of a further modified wafer of FIG. 8 in accordance with an illustrative embodiment. Design tool 105 in FIG. 1 is usable for designing the artifacts shown in FIG. 9. Fabrication process control application 107 in FIG. 1 controls a process for fabricating the artifacts depicted in this figure. All depicted artifacts are the same as the corresponding artifacts in FIG. 8, except where depicted or described differently in FIG. 9.

An embodiment fabricates structures 972 in each electrically decoupled cell, such as in each PUF cell resulting from the operation described with respect to FIG. 8. For example, the design tool configures, and the fabrication process control application uses the configuration and causes a fabrication process to fabricate structures 972 using any suitable process.

In one embodiment, structures 972 are usable to control the charging and discharging of the DT Caps in deep-trenches 722, 724, and 726. One example embodiment forms structures 972 as pass gate transistors.

The specific type and function of structures 972 are described only as examples without implying a limitation thereto. Those of ordinary skill in the art will be able to contemplate from this disclosure other structures for a similar purpose and the same are contemplated within the scope of the illustrative embodiments.

Figure 10:
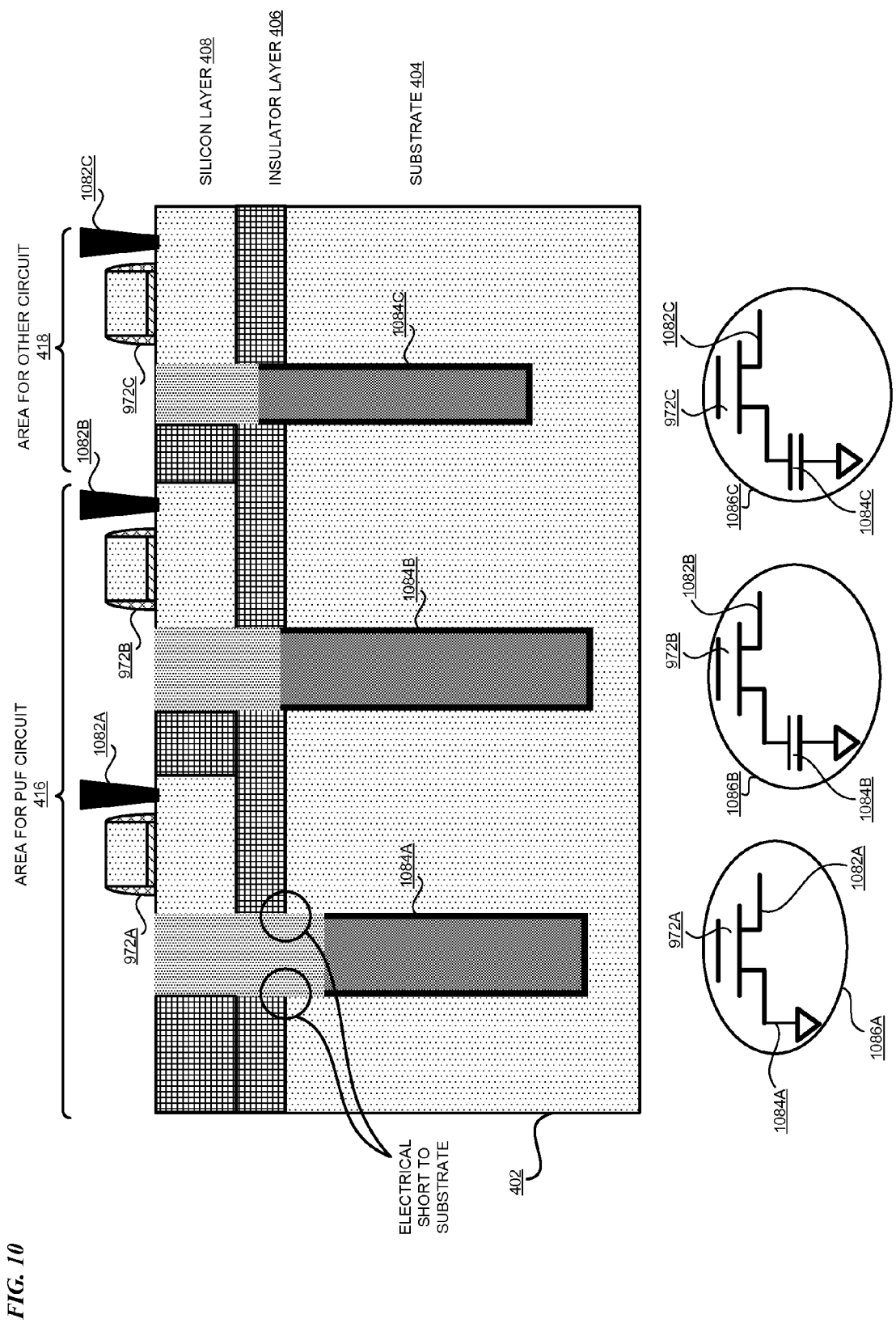
FIG. 10 depicts a cross-section of a further modified wafer of FIG. 9 in accordance with an illustrative embodiment.

With reference to FIG. 10, this figure depicts a cross-section of a further modified wafer of FIG. 9 in accordance with an illustrative embodiment. Design tool 105 in FIG. 1 is usable for designing the artifacts shown in FIG. 10. Fabrication process control application 107 in FIG. 1 controls a process for fabricating the artifacts depicted in this figure. All depicted artifacts are the same as the corresponding artifacts in FIG. 9, except where depicted or described differently in FIG. 10.

An embodiment fabricates structures 1082A, 1082B, and 1082C in each of the three depicted example electrically decoupled cells, respectively. For example, the design tool configures, and the fabrication process control application uses the configuration and causes a fabrication process to fabricate structures 972 using any suitable process. Structures 1082A, 1082B, and 1082C each operates as a terminal, contacts, or electrical connector to charge and discharge DT Cap 1084A, 1084B, and 1084C, respectively. Structures 1082A-C can be formed using any suitable electrically conducting material within the scope of the illustrative embodiments.

The specific type and function of structures 972 are described only as examples without implying a limitation thereto. Those of ordinary skill in the art will be able to contemplate from this disclosure other structures for a similar purpose and the same are contemplated within the scope of the illustrative embodiments.

Circuit diagrams 1086A, 1086B, and 1086C represent the electrical circuits in each of the three depicted example cells. Circuit diagram 1086A represents a PUF cell comprising DT Cap 1084A, contact 1082A, and structure 972A. Notice that due to electrical short to substrate in DT Cap 1084A, circuit diagram 1086A does not show a capacitor but shows a short circuit in place of DT Cap 1084A.

Circuit diagram 1086B represents a PUF cell comprising DT Cap 1084B, contact 1082B, and structure 972B. Notice that because DT Cap 1084B is operational, circuit diagram 1086B shows capacitor 1084B in the circuit.

Circuit diagram 1086C represents a cell in the other circuit in area 418. Circuit diagram 1086C comprises DT Cap 1084C, contact 1082C, and structure 972C. Notice that because DT Cap 1084C is operational, circuit diagram 1086C shows capacitor 1084C in the circuit.

Figure 11:
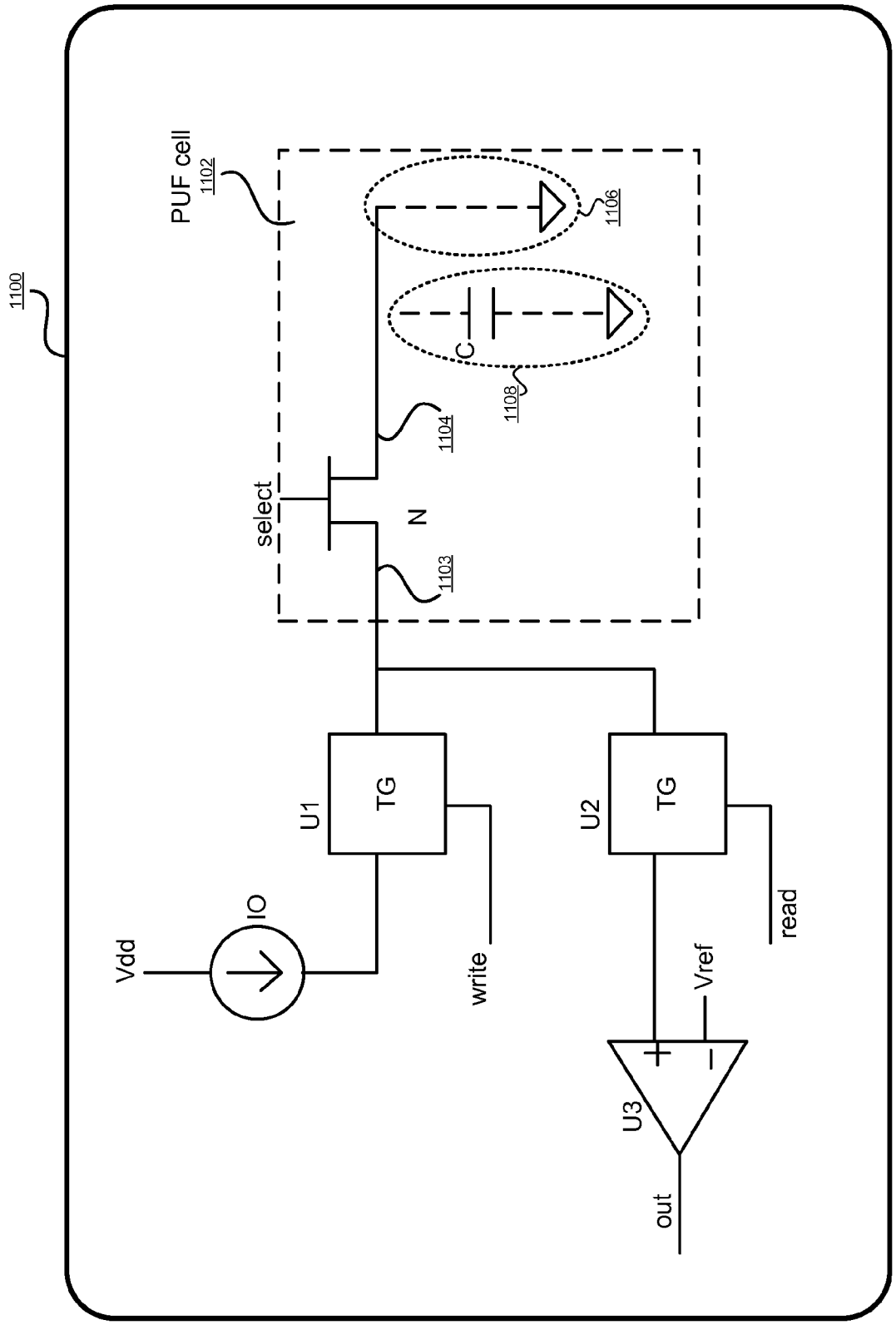
FIG. 11 depicts a circuit diagram for using an on-chip structure for a security application in accordance with an illustrative embodiment.

With reference to FIG. 11, this figure depicts a circuit diagram for using an on-chip structure for a security application in accordance with an illustrative embodiment. Circuit 1100 includes PUF cell 1102, which is depicted with two mutually exclusive variations, one variation corresponding to circuit diagram 1086A and another corresponding to circuit diagram 1086B in FIG. 10. In other words, one instance of PUF cell 1102 can only take one form—either that of circuit diagram 1086A or that of circuit diagram 1086B. The two variations represent different instances of PUF cell 1102.

When terminal 1104 of gate transistor N is connected to leg 1106 in an instance of PUF cell 1102, that instance of PUF cell 1102 represents PUF cell 1086A with a failed DT Cap, e.g., DT Cap 1084A in FIG. 10. When terminal 1104 of gate transistor N is connected to leg 1108 (with leg 1106 disconnected) in an instance of PUF cell 1102, that instance of PUF cell 1102 represents PUF cell 1086B with an operational DT Cap, e.g., DT Cap 1084B in FIG. 10. Which of legs 1106 and 1108 exists in a given instance of PUF cell 1102 is a random phenomenon resulting from process variations during the fabrication of DT Caps as described earlier.

In an example configuration selected only to illustrate the operation of a PUF cell of an embodiment and not to imply a limitation thereto, Vdd is a voltage supplied to circuit 1100 by a power supply. I0 is a current source that feeds a current to the PUF cell 1102, if operational, during a write operation. If PUF cell 1102 includes a DT capacitor, the current charges the capacitor and electrical charge is saved in the capacitor causing a voltage across the capacitor's terminals. If PUF cell 1102 does not have a functional DT capacitor and is electrically short circuited to the substrate, the current is connected to the ground and no electrical charge is saved in the capacitor.

A write operation within the scope of the illustrative embodiments is any operation that sends charging current into PUF cell 1102. A read operation within the scope of the illustrative embodiments is any operation that drains a DT Cap in PUF cell 1102, if PUF cell 1102 has an operational DT Cap, e.g., when leg 1108 is connected to terminal 1104.

U1 is a transmission gate for a write operation. When the control terminal labeled "write" is at logic high, e.g., representing logical value 1 in circuit 1100, U1 is turned on, and I0 is directed to PUF cell 1102 as a charging current.

U2 is a transmission gate for the read operation. When the control terminal labeled "read" is at logic high, e.g., representing logical value 1 in circuit 1100, U2 is turned on, and any voltage, if saved in an operational DT Cap in PUF cell 1102 is connected to voltage comparator U3 to determine if the voltage in PUF cell 1102 is logic high or logic low (e.g., representing logical value 0 in circuit 1100).

U3 is a voltage comparator, where the positive input is connected to U2, and the negative input is connected to a reference voltage Vref (a threshold voltage). If the voltage on the positive input of comparator U3 is higher than Vref, the output of comparator U3 is at logic high, otherwise the output of comparator U3 is at logic low.

In PUF cell 1102, gate transistor N allows or disallows charging current I0 to the leg connected to terminal 1104. In one example embodiment, gate transistor N is a built-in negative channel field effect transistor (NFET) with source terminal 1104 connected to leg 1106 or 1108, randomly as the case may be. Drain terminal 1103 is connected to transmission gates U1 and U2 for the write and read operations, respectively. Gate transistor N is connected to "select" signal. When "select" is at logic high, PUF cell 1102 is selected, and source terminal 1104 and drain terminal 1103 are electrically connected so that a current can flow across gate transistor N to the leg that happens to be connected to source terminal 1104.

Any number of PUF cells 1102 can be so configured to output any number of logic high or logic low (1 or 0) at the "out" terminal of comparator U3. In one embodiment, I0, U1, U2, and U3 are shared by multiple PUF cells 1102 with randomly operational or failed DT Caps existing therein.

In operation, as a first step, a "write" operation attempts to write logical 1 to PUF cell 1102, e.g., by storing a voltage in a DT Cap in PUF cell 1102, if one is operational therein. If that instance of PUF cell 1102 has an operational DT Cap (C), current I0 charges capacitor C to a voltage value higher than Vref. The voltage is saved in that instance of PUF cell 1102 at the completion of the write operation. If the instance of PUF cell 1102 has a failed DT Cap, source terminal 1104 is effectively connected to a sink, e.g., the ground. Consequently, no voltage is saved in that instance of PUF cell 1102 at the completion of the write operation.

As a second step, a "read" operation reads the instances of PUF cell 1102. For example, in one configuration, each instance of PUF cell 1102 is read one by one sequentially.

If the instance of PUF cell 1102 that is being read has an operational capacitor C, the output of voltage comparator U3 is at logic high, and a "logic high" or logic value 1 is read from the cell. If the instance of PUF cell 1102 has a failed capacitor, the output of voltage comparator U3 is at logic low, and a "logic low" or logic value 0 is read from the cell. Because the presence of an operational capacitor C in each instance of PUF cell 1102 is random, the output of 1 or 0 from a series of PUF cell instances is also random. In one embodiment, the logic 1 or logic 0 of a PUF cell occupies a position in the bit-string corresponding to the position of the PUF cell instance in the order or sequence of reading the PUF cell instances.

Generally, within the scope of the illustrative embodiments a comparator, or another similarly purposed circuit or structure, can be used to determine whether an output voltage of a PUF cell exceeds the threshold voltage value. Similarly, within the scope of the illustrative embodiments, the comparator or another suitably configured circuit in the IC, can be used to produce a logic value of 1 or 0 at a position in a bit-string. Any suitably configured circuit or structure can be used to repeat the comparing of the output voltage to the threshold and the producing of the logic 1s and 0s for each PUF cell. Any suitably configured circuit or structure can be employed to use, or output for use, the bit-string in a security application as a random stable value.

Figure 12:
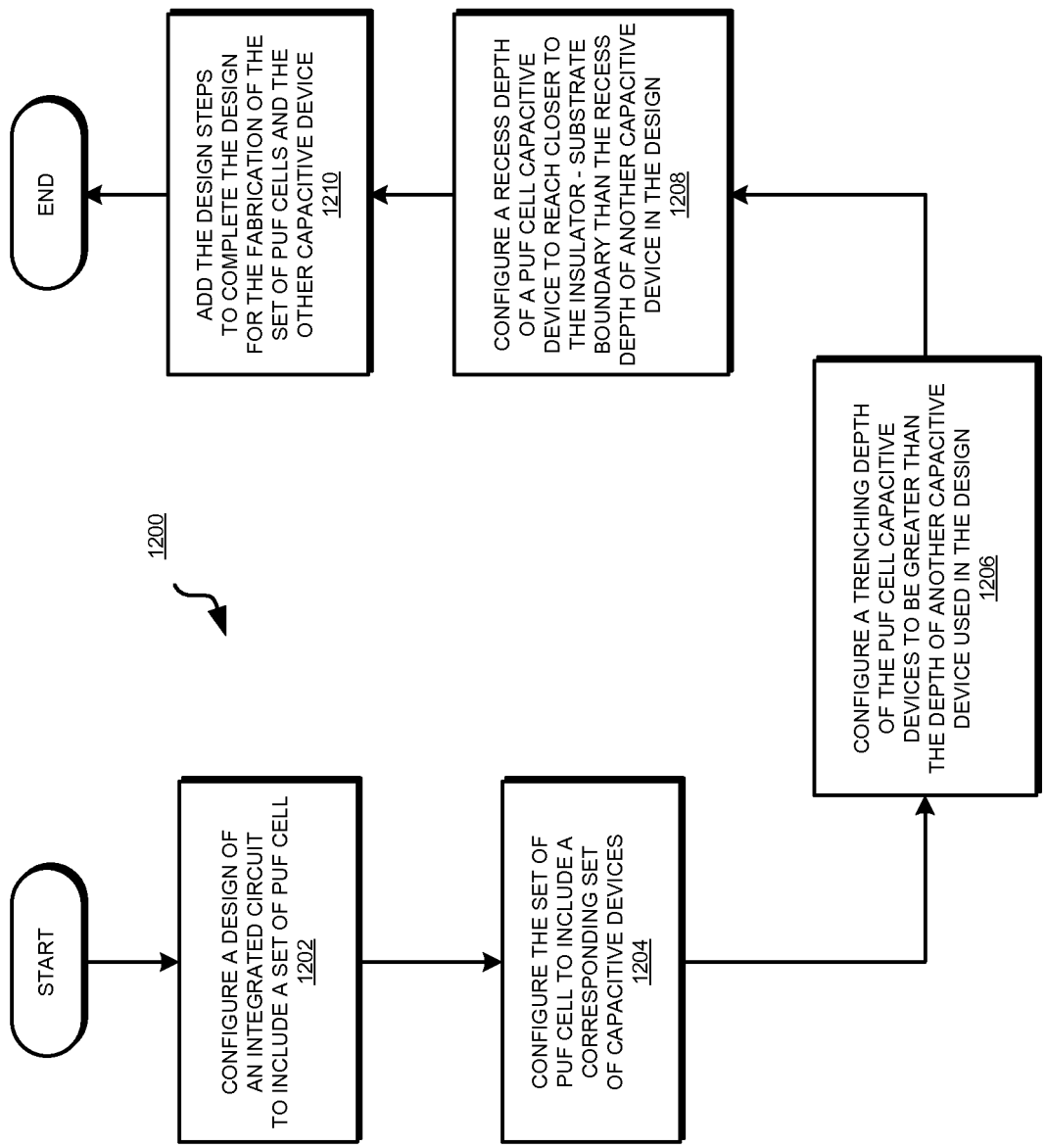
FIG. 12 depicts a flowchart of an example process of configuring an on-chip structure for security application in accordance with an illustrative embodiment.

With reference to FIG. 12, this figure depicts a flowchart of an example process of configuring an on-chip structure for security application in accordance with an illustrative embodiment. Process 1200 can be implemented in a design tool, such as design tool 105 in FIG. 1.

The design tool configures a design of an integrated circuit to include a set of PUF cells (block 1202). The design tool further configures the set of PUF cells to include a corresponding set of capacitive devices, e.g., one capacitive device per PUF cell (block 1204).

The design tool configures a trenching depth of the PUF cell capacitive devices to be greater than the depth of another capacitive device in the design of the IC (block 1206). The design tool configures a recess depth of a PUF cell capacitive device to reach closer to the insulator-substrate boundary than the recess depth of another capacitive device in the design of the IC (block 1208).

The design tool adds the design steps to complete the design for the fabrication of IC including the set of PUF cells and other capacitive devices in the IC (block 1210). The design tool ends process 1200 thereafter. The design prepared by the design tool using process 1200 is then usable in a fabrication process, the fabrication process having process variations, to fabricate the IC circuit and the set of PUF cells, where each PUF cell includes an operational or failed capacitive device randomly owing to the process variations.

Figure 13:
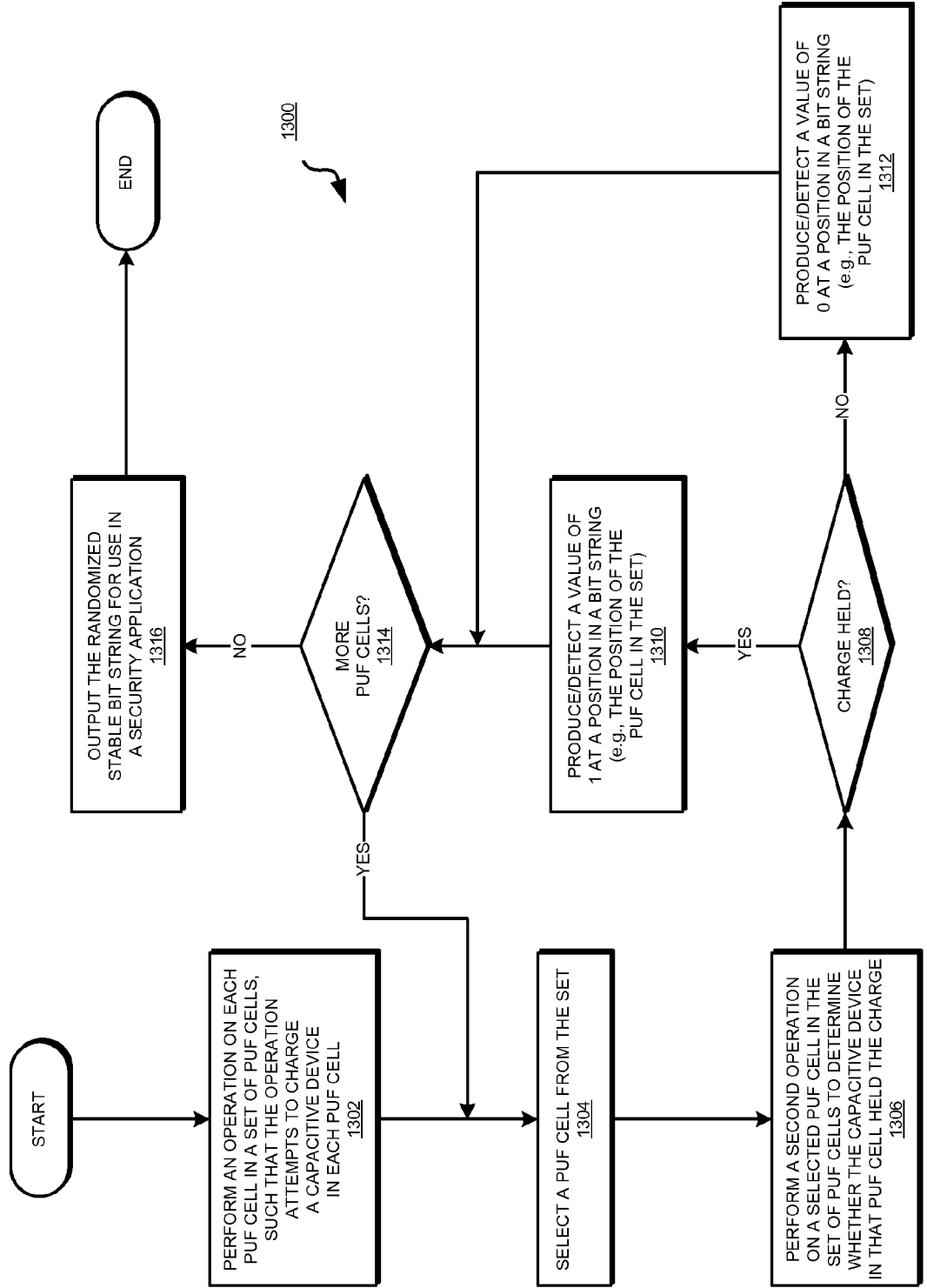
FIG. 13 depicts a flowchart of an example process of using an on-chip structure for security application in accordance with an illustrative embodiment.

With reference to FIG. 13, this figure depicts a flowchart of an example process of using an on-chip structure for security application in accordance with an illustrative embodiment. Process 1300 can be implemented in security application 115 in FIG. 1.

The application performs an operation on each PUF cell in a set of PUF cells such that the operation attempts to charge a capacitive device each PUF cell (block 1302). The application selects a PUF cell from the set of PUF cells (block 1304). The application performs a second operation on the selected PUF cell to determine whether the capacitive device in the selected PUF cell held the charge such that the voltage from the capacitive device exceeds a threshold (block 1306).

If the capacitive device held the charge ("Yes" path of block 1308), the application produces or detects a value of logic 1 at a position in a bit-string, for example, at the position corresponding to a position occupied by the PUF cell in the set of PUF cells (block 1310). If the capacitive device did not hold the charge ("No" path of block 1308), the application produces or detects a value of logic 0 at a position in a bit-string, for example, at the position corresponding to a position occupied by the PUF cell in the set of PUF cells (block 1312).

The application determines whether more PUF cells in the set of PUF cells have to be subjected to the second operation in a similar manner (block 1314). If more PUF cells remain ("Yes" path of block 1314,) the application returns process 1300 to block 1304. If no more PUF cells remain ("No" path of block 1314), the application outputs the randomized stable bit-string for use in a security configuration or another security application, such as for authentication or encryption (block 1316). The application ends process 1300 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for fabrication and use of an on-chip structure for security application.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), cross-sections of wafers, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for hardware-based stable random number generation, the method comprising:
   configuring a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices;
   sending a charging current to the set of PUF cells, wherein the charging current is sufficient to charge an operational capacitive device in a PUF cell above a threshold voltage value;
   determining whether an output voltage of a PUF cell in the set of PUF cells exceeds the threshold voltage value;
   producing, responsive to the output voltage exceeding the threshold voltage value, a logic value of 1 at a position in a bit-string;
   repeating the determining and the producing for each PUF cell in the set of PUF cells to output a bit-string, wherein the bit-string includes 1 s and 0s in random positions;
   using the bit-string in a security application as a random stable value owing to a random pattern of 1s and 0s present in the bit-string; and
   configuring a width of a capacitive device in the set of capacitive devices to be greater than a width of a second capacitive device that is not a member of the set of capacitive devices, the second capacitive device being used in the IC outside the set of PUF cells.

2. The method of claim 1, wherein a capacitive device in the subset of capacitive devices that have failed results from a failure during the fabrication, the failure causing a short circuit across a dielectric layer in the capacitive device in the subset of capacitive devices that have failed.

3. The method of claim 2, wherein the failure results from a process variation in the fabrication process, the process variation causing the fabrication process to etch through an insulator-substrate boundary causing an electrically conducting path to form between a conducting material in the capacitive device and the material of a substrate.

4. The method of claim 1, wherein the subset of PUF cells including the subset of capacitive devices that have failed comprises random members of the set of PUF cells.

5. The method of claim 4, further comprising:
configuring a second set of PUF cells in a second IC, a PUF cell in the second set of PUF cells being identical in design to a PUF cell in the set of PUF cells, wherein configuring the second set of PUF cells causes a second subset of the second set of PUF cells to include a corresponding second subset of capacitive devices that have failed during a second fabrication of the second subset of capacitive devices, wherein different random members of the second set of PUF cells comprise the second subset of PUF cells.

6. The method of claim 1, wherein the sending is unsuccessful in charging above the threshold voltage value a capacitive device in the subset of capacitive devices that have failed.

7. The method of claim 1, wherein the determining comprises:
comparing the output voltage of the PUF cell with a reference voltage in a comparator circuit, wherein the reference voltage is the threshold voltage value.

8. The method of claim 1, further comprising:
repeating the determining for each PUF cell in the set of PUF cells.

9. The method of claim 1, wherein the position corresponds to a position of the PUF cell in the set of PUF cells.

10. The method of claim 1, wherein the position corresponds to a position of the PUF cell in a sequence in which the output voltage of the PUF cell participates in the determining.

11. The method of claim 1, further comprising:
determining whether an output voltage of a second PUF cell in the set of PUF cells exceeds the threshold voltage value; and
producing, responsive to the output voltage of the second PUF cell not exceeding the threshold value, a logic value of 0 at another position in a bit-string.

12. The method of claim 1, wherein the logic 1s and logic 0s appear in the same respective positions in the bit-string each time the bit-string is generated by repeating the sending, the determining, and the producing.

13. A computer program product for hardware-based stable random number generation, the computer program product comprising:
one or more computer-readable tangible storage devices;
program instructions, stored on at least one of the one or more storage devices, to configure a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices;
program instructions, stored on at least one of the one or more storage devices, to configure sending a charging current to the set of PUF cells, wherein the charging current is sufficient to charge an operational capacitive device in a PUF cell above a threshold voltage value;
program instructions, stored on at least one of the one or more storage devices, to configure determining whether an output voltage of a PUF cell in the set of PUF cells exceeds the threshold voltage value;
program instructions, stored on at least one of the one or more storage devices, to configure producing, responsive to the output voltage exceeding the threshold voltage value, a logic value of 1 at a position in a bit-string;
program instructions, stored on at least one of the one or more storage devices, to configure repeating the determining and the producing for each PUF cell in the set of PUF cells to output a bit-string, wherein the bit-string includes 1s and 0s in random positions;
program instructions, stored on at least one of the one or more storage devices, to configure using the bit-string in a security application as a random stable value owing to a random pattern of 1s and 0s present in the bit-string; and
program instructions, stored on at least one of the one or more storage devices, to configure a width of a capacitive device in the set of capacitive devices to be greater than a width of a second capacitive device that is not a member of the set of capacitive devices, the second capacitive device being used in the IC outside the set of PUF cells.

14. The computer program product of claim 13, wherein a capacitive device in the subset of capacitive devices that have failed results from a failure during the fabrication, the failure causing a short circuit across a dielectric layer in the capacitive device in the subset of capacitive devices that have failed.

15. The computer program product of claim 14, wherein the failure results from a process variation in the fabrication process, the process variation causing the fabrication process to etch through an insulator-substrate boundary causing an electrically conducting path to form between a conducting material in the capacitive device and the material of a substrate.

16. The computer program product of claim 13, further comprising:
program instructions, stored on at least one of the one or more storage devices, to configure a width of a capacitive device in the set of capacitive devices to be greater than a width of a second capacitive device that is not a member of the set of capacitive devices, the second capacitive device being used in the IC outside the set of PUF cells.

17. An apparatus for hardware-based stable random number generation, comprising:
a set of physical unclonable function (PUF) cells in an integrated circuit (IC) with a set of capacitive devices, each PUF cell in the set of PUF cells including a corresponding capacitive device in the set of capacitive devices, and wherein a subset of the set of PUF cells includes a corresponding subset of capacitive devices that have failed during fabrication of the subset of capacitive devices;
a current source to send a charging current to the set of PUF cells, wherein the charging current is sufficient to charge an operational capacitive device in a PUF cell above a threshold voltage value;
a comparing circuit to determine whether an output voltage of a PUF cell in the set of PUF cells exceeds the threshold voltage value;

a circuit to produce, responsive to the output voltage exceeding the threshold voltage value, a logic value of 1 at a position in a bit-string;

a circuit to repeat the determining and the producing for each PUF cell in the set of PUF cells to output a bit-string, wherein the bit-string includes 1s and 0s in random positions; and a circuit to use the bit-string in a security application as a random stable value owing to a random pattern of 1s and 0s present in the bit-string; and a circuit to configure a width of a capacitive device in the set of capacitive devices to be greater than a width of a second capacitive device that is not a member of the set of capacitive devices, the second capacitive device being used in the IC outside the set of PUF cells.

* * * * *